United States Patent [19]
Yanagisawa

[11] Patent Number: 5,661,965
[45] Date of Patent: Sep. 2, 1997

[54] STEEL CORDS FOR THE REINFORCEMENT OF RUBBER ARTICLES AND HEAVY DUTY PNEUMATIC RADIAL TIRES USING THE SAME

[75] Inventor: Manabu Yanagisawa, Kodaira, Japan

[73] Assignee: Bridgestone Corporation, Tokyo, Japan

[21] Appl. No.: 408,116

[22] Filed: Mar. 21, 1995

Related U.S. Application Data

[63] Continuation of Ser. No. 47,310, Apr. 19, 1993, abandoned.

[30] Foreign Application Priority Data

Apr. 24, 1992 [JP] Japan ..................... 4-106708

[51] Int. Cl.$^6$ ........................................ D02G 3/36
[52] U.S. Cl. .................. 57/213; 57/311; 57/902
[58] Field of Search ................. 57/210, 212, 213, 57/217, 223, 311, 902

[56] References Cited

U.S. PATENT DOCUMENTS 4,781,016  11/1988  Sato et al. ..................... 57/213

FOREIGN PATENT DOCUMENTS

| | | |
|---|---|---|
| 0176139 | 4/1986 | European Pat. Off. . |
| 462716 | 12/1991 | European Pat. Off. ........ 57/902 |
| 2676466 | 11/1992 | France .................... 57/902 |
| 56-14396 | 4/1981 | Japan . |
| 59-223503 | 12/1984 | Japan . |
| 40687 | 2/1989 | Japan .................... 57/212 |
| 343776 | 11/1992 | Japan .................... 57/902 |
| 51884 | 3/1993 | Japan .................... 57/902 |

OTHER PUBLICATIONS

Research Disclosure, No. 327, Jul. 1991, Emsworth GB, pp. 552–558.
Research Disclosure, No. 175, Nov. 1978, Emsworth GB, pp. 26–27.

*Primary Examiner*—William Stryjewski
*Attorney, Agent, or Firm*—Sughrue, Mion, Zinn, Macpeak & Seas

[57] ABSTRACT

A rubber article-reinforcing steel cord includes a core obtained by forming a single filament in a wavy shape, an inner sheath formed by arranging 5 to 6 filaments around the core, and an outer sheath formed by arranging 9 to 12 filaments around the inner sheath. The inner sheath and said outer sheath are twisted together. The diameter of each of the filaments of the inner and outer sheaths is not greater than that of the filaments of the core, $5d \leq L \leq 3d$ and $1.2 \leq H \leq d2.0d$ in which L and H are a wave length and a wave height of a wave shape of the waved filaments of the core, respectively, and d is a diameter of the filament of the core, and a ratio $p_3/p_2$ between the twisting pitch $p_2$ of the inner sheath and the twisting pitch $p_3$ of the outer sheath is in a range of 1.4 to 2.5. A heavy duty pneumatic radial tire is also disclosed, which uses such steel cords in a belt.

3 Claims, 2 Drawing Sheets

5,661,965

STEEL CORDS FOR THE REINFORCEMENT OF RUBBER ARTICLES AND HEAVY DUTY PNEUMATIC RADIAL TIRES USING THE SAME

This is a continuation of application No. 08/047,310 filed Apr. 19, 1993, now abandoned.

BACKGROUND OF THE INVENTION (1) Field of the Invention:

The present invention relates to steel cords to be used as a reinforcement for rubber articles, for example, pneumatic tires to be used in heavy duty vehicles such as trucks or buses and industrial belts. In particular, the present invention is directed to an improvement in fatigue resistance and corrosion propagation resistance of steel cords required for heavy duty tires.

(2) Related Art Statement:

A variety of properties have been required for steel cords to be used in, for example, heavy duty pneumatic tires. Among those properties, adhesion property to rubber is an important property, because the adhesion property affords large effects upon fatigue resistance and corrosion resistance. Regarding improvement upon the adhesion property to rubber, Japanese Utility Model registration publication No. 56-14,396 describes that when core wires are helically formed and a plurality of peripheral filaments are twisted around the outer periphery of the core wire in the state that a plurality of these peripheral filaments do not contact one another, the adhesion property to rubber can be improved together with improvement on corrosion resistance of the steel cord itself through penetrating the rubber up to the interior of the cord.

However, in the case of a two-layer twisted structure having a construction of 3+6 illustrated in Japanese Utility Model registration publication No. 56-14,396, the diameter of the filaments needs be made greater to increase strength of the filaments, which is disadvantageous from the standpoint of fatigue resistance and makes it difficult to penetrate rubber in the interior of the three filament-twisted core wire.

However, since the three-layer twisted steel cords having a construction of 3+9+15 have excellent fatigue resistance, such three-layer twisted cords have been used as reinforcement for heavy duty tires. However, this three-layer twisted steel cord has the problem in that if the diameters of the filaments constituting the cord are made substantially equal, the filaments of each layer contact adjacent ones so that the rubber has difficultly entering the interior of the cord to deteriorate corrosion resistance of the cord.

With the above problem in mind, Japanese patent application Laid-open No. 59-223,503 proposes a 4+9+14 construction in which gaps are retained among filaments by reducing the number of filaments in the intermediate layer and the outer layer from that corresponding to the closest packing structure. However, when the core filaments are helically formed and a plurality of peripheral filaments are twisted around the outer periphery of the core filaments, there is the possibility that the filaments in the intermediate layer fall inside a circle defined by the helically formed core filaments. As a result, the permeation of the rubber into the interior of the cord may be interrupted or the uniform pulling of the filaments in the intermediate layer and the outer layer is deteriorated, resulting in the deterioration in tenacity or fatigue resistance of the cord. In particular, it is difficult to penetrate rubber inside the four filament-twisted core wires. Further, if the number by which the filaments are reduced in the intermediate layer and the outer layer is small, penetrability of the rubber inside the cord is low. If the number of the filaments is further reduced, the tenacity of the cord is lowered to make the cord unsuitable as reinforcement for the tire.

SUMMARY OF THE INVENTION

The present invention is directed to the above three-layer twisted cord having excellent fatigue resistance, and is directed to provide a rubber-reinforcing steel cord in which durability is improved by penetrating rubber in the interior of the cord to a largely increased degree without lowering tenacity of the cord. The invention is also to provide a heavy duty radial tire in which such steel cords are used in a belt.

The present invention is directed to a rubber article-reinforcing steel cord comprising a core obtained by forming a single filament in a wavy shape, an inner sheath formed by arranging 5 to 6 filaments around the core, and an outer sheath formed by arranging 9 to 12 filaments around the inner sheath, said core, said inner sheath and said outer sheath being twisted together, wherein the diameter of each of the filaments of the inner and outer sheaths is not greater than that of the filaments of the core, $5d \leq L \leq 30d$ and $1.2d \leq H \leq 2.0d$ in which L and H are a wave length and a wave height of a wave shape of the waved filament of the core, respectively, and d is a diameter of the filament of the core, and a ratio $p_3/p_2$ between the twisting pitch $p_2$ of the inner sheath and the twisting pitch $p_3$ of the outer sheath is in a range of 1.4 to 2.5. The present invention is further directed to a heavy duty pneumatic radial tire comprising a carcass as a skeleton, and a belt arranged radially outwardly of said carcass, said carcass extending toroidally between a pair of bead portions, wherein said belt is comprised of steel cords.

In the present invention, it is preferable to use, as the filaments constituting the steel cord, steel filaments which have a chemical composition corresponding to that of a piano wire or a hard steel wire having a content of carbon of 0.70 to 0.85 wt. % with less nonmetallic inclusion and are drawn to a diameter of 0.12 to 0.35 mm. The reason why the content of carbon is limited to not less than 0.70 wt. % is to increase tensile strength of the steel cord per unit weight to, for example, reduce the weight of the tire. The reason why the content of carbon is preferably limited to not more than 0.85 wt. % is that if the carbon content is more than 0.85 wt. %, fatigue resistance is deteriorated. The reason why the diameter of the filament is preferably limited to not less than 0.35 mm is that if the diameter is more than 0.35 mm, fatigue resistance of the cord decreases. On the other hand, the reason why the diameter of the filament is preferably not less than 0.12 mm is that enough strength to reinforce, for example, heavy duty pneumatic tires, is given to cords.

These and other objects, features and advantages of the invention will be apparent upon the reading of the following description of the invention when taken in conjunction with attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

Figure 1:
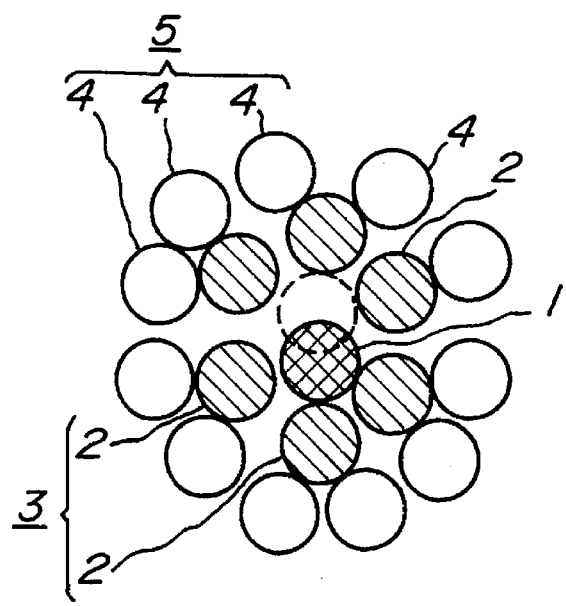
FIG. 1 is a sectional view of a steel cord according to the present invention.
Figure 2A:
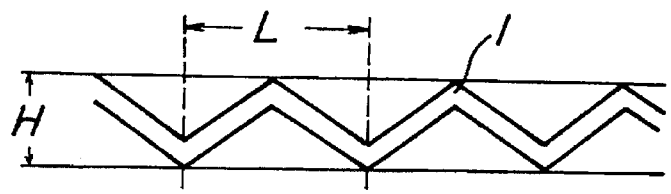
FIGS. 2(a) and 2(b) are views for illustrating wave shapes guide to core filaments, respectively.
Figure 2B:
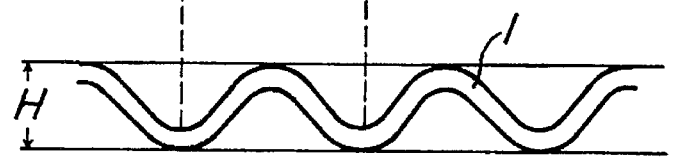

In FIG. 1 is shown a sectional view of a steel cord according to the present invention. In this figure, a core 1 is made of a single filament, an inner sheath 3 is arranged around the outer periphery of the core 1, and an outer sheath 5 is arranged around the outer periphery of the inner sheath 3. The inner sheath 3 is constituted by six filaments 2, and the outer sheath is constituted by eleven filaments 4. As shown in FIG. 2(a) or 2(b), the core 1 is formed in a waved shape. It is indispensable for the wave shape of the core to satisfy $5d \leq L \leq 30d$ and $1.2 \leq d \leq H \leq 2.0d$ in which L, H and d are a wave length, a wave height and a diameter of the filament, respectively. The shape of the waves of the filament may be either of a climpto as a two-dimensional wave shape, such as a rectangular shape or a sinusoidal shape or of a helical shape as a three-dimensional wave shape.

The reason why the construction of the steel cord according to the present invention is limited to the three-layer twisting is to ensure good fatigue resistance. The reason why the inner and outer sheaths are constituted not by twisted wires but by the filaments is not only to improve productivity but also to avoid a phenomenon that when the sheath is constituted by the twisted wires, rubber is difficult to enter the interior of the sheath, resulting in deterioration in corrosion resistance of the cord.

Next, the reason why the wave length L of the wave shape of the formed core and the diameter d of the filament constituting the core must satisfy the relationship: $5d \leq L \leq 30d$ will be explained. The reason is that if the wave length L exceeds 30d, side pressure resistance (resistance of the cord against pressure applied to the peripheral face of the cord) is decreased, with the result that gaps among the filaments of the cord, for example, during the production of the tire, decrease to make difficult the permeation of rubber into the interior of the cord. On the other hand, if the wave length L is less than 5d, wave-forming conditions for the core filament becomes severer to lower tensile strength of the filament of the core.

The reason why the wave height H of the wave shape of the formed core must satisfy the range of $1.2d \leq E \leq 2.0d$ is that if the wave height is less than 1.2d, the gaps among the filaments in the inner and outer sheaths become so small that the degree of the rubber permeation in interior of the cord drops, whereas, if the wave height H is more than 2.0d, the arrangement of the filaments in the inner and outer sheath become disturbed so that the gaps among the filaments become non-uniform with the result that no rubber penetrate through filaments depending upon locations.

In order to have rubber penetrate between the inner and outer sheaths, it is indispensable that the twisting pitch $p_2$ of the inner sheath and the twisting pitch $p_3$ of the outer sheath satisfy the ratio $p_3/p_2$ being 1.4 to 2.5 to prevent the filaments of the outer sheath from entering between the filaments of the inner sheath. If the ratio $p_3/p_2$ does not fall in the range of 1.4 to 2.5, the uniform pulling of the filaments is deteriorated.

When the above Steel cords are used in a belt of a heavy duty pneumatic radial tire, rubber well penetrates inside the cords. Accordingly, a phenomenon so called "cut separation" that peeling occurs at a bonded portion due to propagation of corrosion inside the cord can be prevented. Further, since the three-layer twisted construction is employed, the steel cords can be employed in the belt of the heavy duty pneumatic radial tire without increasing the diameter of the filaments. This is advantageous from the standpoint of the fatigue resistance. The content of carbon in the steel cord is preferably set at 0.80 to 0.85 wt. %, because in this case, a sufficient distance can be assured between the buried cords, and fracture durability at end portions of the belt can be improved, when the strength (tenacity×end count of the cords) of the belt is made equal.

The twisting manner may be either a buncher twisting or a tubular twisting. However, tubular twisting by which the filaments of the cord themselves are not twisted is preferred from the standpoint of the fatigue resistance. The twisting direction of the inner sheath and the outer sheath may be either normal or reverse. Further, the wave shape afforded upon the core 1 may extend in either a climpto or helical shape in the same plane.

[Experiment]

Figure 3:
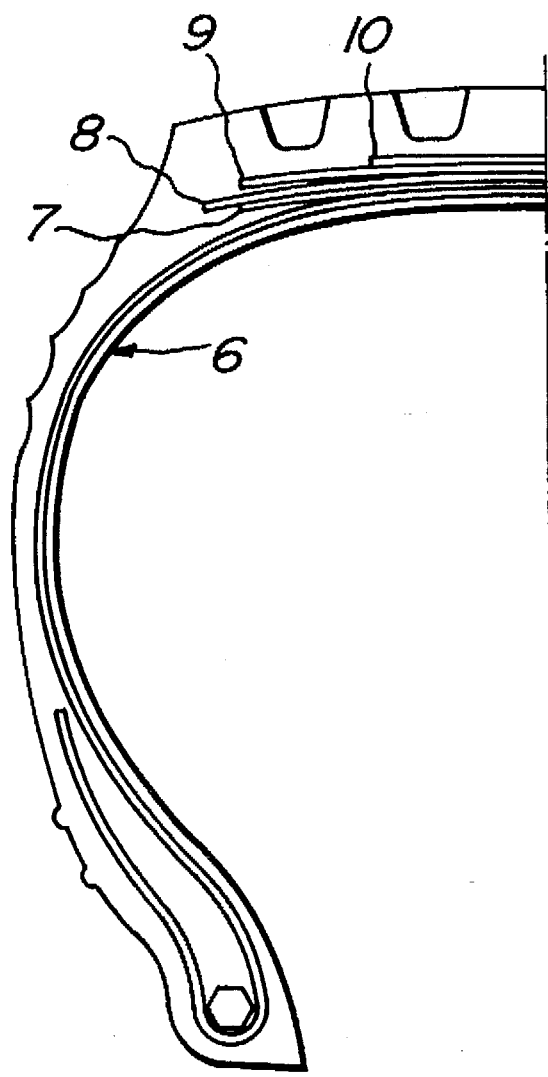
FIG. 3 is a sectional view of a pneumatic tire to which the cords according to the present invention are applied.

Steel cords having a specification shown in Table 1 are applied to a truck-bus pneumatic radial tire as shown in FIG. 3. That is, the tire shown in FIG. 3 had four belt layers 7 through 10 on a carcass 6, and the steel cords given in Table 1 were applied to the belt layers 8 and 9. In this manner, various tires were prepared for testing.

With respect to the thus obtained tires, corrosion propagation resistance and cut separation resistance of the steel cords were evaluated, and results are also given in Table 1. A formed amount of the core in Table 1 was determined by taking out a core filament from the steel cord after removal of the sheaths such that no permanent deformation might occur upon the core filament, observing the core filament by means of a magnifying lens and measuring the wave length L and the wave height H indicated in FIG. 2.

The corrosion propagating resistance was examined according to a cut end corrosion (CEC) process. That is, the surface of a rubberized steel cord cut out from the belt layer of the tire was coated with a silicone sealant, opposite ends of the steel cord each were cut off after drying to give a sample of a length of about 10 cm, one end of the cord was immersed in a 10% sodium hydroxide aqueous solution for 24 hours, the cord was taken out from the solution, and a length of the rubber peeling from the cord from said one end was measured.

The cut separation resistance was evaluated according to a corrosion propagation drum testing method. That is, each tire was bored with a drill at three locations on a peripheral portion of the tire from an inner face of the tire to reach second to third belts, water was sealingly filled in a tire tube, then the tire was assembled onto a rim, and the tire was run on a drum over a distance of 20,000 km. Thereafter, the tire was decomposed, and the cut separation resistance was evaluated by measuring a maximum length of peeling at a bonded portion due to rust of the cord in the second and third belts.

TABLE 1(a)

| | Comparative Example 1 | Comparative Example 2 | Example 1 | Example 2 |
|---|---|---|---|---|
| Construction | 3 + 9 + 15 + 1 | 4 + 9 + 14 | 1 + 6 + 11 | 1 + 6 + 11 |
| Diameter of filament (mm)* | 0.23/0.23/0.23/0.15 | 0.23/0.23/0.23 | 0.30/0.25/0.25 | 0.30/0.25/0.25 |
| Twisting pitch (mm) | 5/12/18/5.5 | 5/11/17 | 3.3/11/17 | 1.5/11/17 |
| Twisting direction | s/s/z/s | s/s/z | -/s/z | -/s/z |
| Diameter of cord (mm) | 1.41** | 1.48 | 1.35 | 1.35 |
| Content of carbon (wt %) | 0.72 | 0.72 | 0.82 | 0.82 |
| Shape of core | straight | straight | climpto | climpto |
| Distance between cords in belt (mm) | 0.78 | 0.71 | 0.84 | 0.84 |
| Core-formed amount | | | | |
| $L/d_1$ | — | — | 11 | 5 |
| $H/d_1$ | — | — | 1.3 | 1.2 |
| $P_3/P_2$ | 1.5 | 1.35 | 1.55 | 1.55 |
| Resistance to corrosion propagation (mm) | entire range | entire range | 10–30 | 10–25 |
| Cut separation resistance (mm) | 400 | 200 | 30 | 20 |

*: Core diameter ($d_1$)/inner sheath diameter ($d_2$)/outer sheath diameter ($d_3$) or $d_1/d_2/d_3$/diameter of spiral filament
**: Diameter of cord containing no spiral filament As compared with Comparative Examples 1 and 2, Examples 1 through 6 falling in the scope of the present invention have excellent corrosion propagation resistance and cut separation resistance.

According to the present invention, the degree of rubber penetration in the interior of the cord can be remarkably increased without lowering the tenacity of the cord in the three-layer twisted cord, so that the rubber article-reinforcing steel cords having excellent fatigue resistance and corrosion propagation resistance can be obtained. Further, when the rubber article-reinforcing steel cords are used in the belt of the heavy duty pneumatic radial tire, cut separation resistance, belt end-fracture resistance, and resistance against fracture due to fatigue of the steel cord can be improved for the heavy duty pneumatic radial tire.

What is claimed is:

1. A rubber article-reinforcing steel cord comprising; a core obtained by forming a single filament in a regular two-dimensional wavy shape, an inner sheath formed by arranging 5 to 6 filaments around the core, and an outer sheath formed by arranging 9 to 12 filaments around the inner sheath, and said core, said inner sheath and said outer sheath being twisted together to form said cord, wherein the diameter of each of the filaments of the inner and outer sheaths is not greater than that of the filaments of the core, $5d \leq L \leq 30d$ and $1.2d \leq H \leq 2.0d$ in which L and H are a wave length and a wave height respectively of a wave shape of the waved filament of the core, and d is a diameter of the filament of the core, and a ratio $p_3/p_2$ between the twisting pitch $p_2$ of the inner sheath and the twisting pitch $p_3$ of the outer sheath is in a range of 1.4 to 2.5.

2. The rubber article-reinforcing steel cord according to claim 1, wherein the filaments constituting the steel cord have a chemical composition of a piano wire or a hard steel wire having a content of carbon of 0.70 to 0.85 wt. %, and have a diameter of 0.12 to 0.35 mm.

3. The rubber article-reinforcing steel cord according to claim 2, wherein the content of carbon is 0.80 to 0.85 wt. %.

* * * * *